United States Patent [19]
Waldon et al.

[11] Patent Number: 6,086,617
[45] Date of Patent: Jul. 11, 2000

[54] USER DIRECTED HEURISTIC DESIGN OPTIMIZATION SEARCH

[75] Inventors: Scott Waldon, Wake Forest; Dave Powell, Chapel Hill; Siu Tong, Apex, all of N.C.

[73] Assignee: Engineous Software, Inc., Morrisville, N.C.

[21] Appl. No.: 08/898,041

[22] Filed: Jul. 18, 1997

[51] Int. Cl.[7] .............................. G06F 17/10; G06F 17/50
[52] U.S. Cl. .................................. 703/2; 706/46; 706/60; 706/902; 706/920
[58] Field of Search ................................... 364/578, 489, 364/488, 164; 395/500, 650, 22, 500.23; 371/27; 381/43; 706/46, 60, 902, 920

[56] References Cited

U.S. PATENT DOCUMENTS

| | | | |
|---|---|---|---|
| 4,926,483 | 5/1990 | Hatazaki et al. | 381/43 |
| 5,319,781 | 6/1994 | Syswerda | 395/650 |
| 5,444,717 | 8/1995 | Rotker et al. | 371/27 |
| 5,640,494 | 6/1997 | Jabri et al. . | |
| 5,675,711 | 10/1997 | Kephart et al. | 395/22 |
| 5,784,596 | 7/1998 | Melamed et al. | 395/500 |
| 5,825,646 | 10/1998 | Keeler et al. | 364/164 |

OTHER PUBLICATIONS

Mechanical Engineering, "Engineous Explores the Design Space", S. Ashley, Feb. 1992, pp. 49–52.
Machine Design, "How to Make Good Designs Even Better", P. Dvorak, Jan. 1993, pp. 38–42.
Scientfic American, "Genetic Algorithms", J. Holland, Jul. 1992, pp. 44–50.
"IDES: Influence Diagram Based Expert System", Dept. of Mech. Eng., Univ. of California, A. Agogino et al, pp. 227–223.
Operations Research (vol. 36, No. 4, Jul.–Aug. 1988), "Probabilistic Inference and Influence Diagrams", R. Schacter, pp. 589–604.
Engineous User Manual, Verson 1.6.5—Mar. 1, 1995, pp. 1–292; Syntax User's Manual for Enginous Developers, Version 1.6.5, Jul. 28, 1994.
Schwefel, "Hill Climbing Strategies", Evolution and Optimum Seeking, Chapter 3, pp. 23–85.
Ansari et al, "Survey of Optimization Techniques", Computational Intelligence for Optimization, Chapter 1.2, pp. 5–10; and "Heuristic Search Methods", Computational Intelligence for Optimization, Chapter 2, pp. 20–24.
Adeli, "Multiobjective Optimization", Advances in Design Optimization, Chapter 7.4, pp. 232–235.
Cheung et al, "Coupling Genetic Algorithm With a Grid Search Method to Solve Mixed Integer Nonlinear Programming Problems" Computers Math. Applic., vol. 34, No. 12, pp. 12–23, 1997,.
Sadeh et al, "Variable and value ordering heuristics for the job shop scheduling constraing satisfaction problem", Artifical Intelligence 86 (1996), pp. 2–41.
Russell, "Hybrid Heuristics for the Vehicle Routing Problem with Time Windows", Transportation Science, vol. 29, No. 2, May 1995, pp. 156–165.

*Primary Examiner*—Kevin J. Teska
*Assistant Examiner*—Samuel Broda
*Attorney, Agent, or Firm*—Nixon & Vanderhye P.C.

[57] ABSTRACT

A directed heuristic search (DHS) has been developed for an optimization design system. The DHS an optimization simulation system has been developed. The DHS directs a design optimization process that implements a user's selections and directions, the order and directions in which the search for an optimal design is to be conducted, and how the search is to sequence through potential design solutions. In addition, DHS is tractable, in that it records a log of the sequence of design solutions that were evaluated during a particular design optimization search. The user may review this search log, to understand how and why the DHS made design optimization decisions. The user may change search parameter settings in a user defined dependency to change future search patterns for optimal designs.

11 Claims, 14 Drawing Sheets

OptimizeDepenciesRandomly

ProcessDepenciesSequentially

ProcessActionsSequentially

ProcessActionsSequentially

OptimizeAction

Up**
Down**
Vary**
VaryByPercent
VarByPercentToBound
UpByPercent
UpByPercentToBound
UpByValue
DownByPercent
DownByPercentToBound
DownByValue
SetToValue
SetToValues

**has internal TC loop others have repeat only if action creates a better solution

USER DIRECTED HEURISTIC DESIGN OPTIMIZATION SEARCH

TECHNICAL FIELD

This invention relates to the field of optimization systems that employ automated methods to seek an optimal solution (s) to a mathematical model or simulation.

BACKGROUND

Engineers, computer programmers, and other designers use simulations to assist in the development of new or improved products, methods and systems. Often, these simulations are mathematical models of the system being designed. For example, mathematical models have been developed of the turbine blades for jet engine aircraft, energy states of molecular electronic components, industrial DC motors, and many other devices and systems. These mathematical models do not physically exist. They are equations and formulas used by engineers, programmers and other designers to predict and simulate the performance and design of the device or system being modeled. The mathematical models may exist only in the notebooks and computers of the designers.

The mathematical models enable a designer to design on paper (or in a computer) a new product or system, without going through the time and expense of building a prototype for each design variation. Using the mathematical models, many different simulations of a new product, method or system may be analyzed. The simulations may be varied by changing the starting or input variables for the mathematical model. The best solution(s) to a mathematical model can be selected for further evaluation. For example, the best solution developed by a mathematical model may be built as a physical prototype to test whether the solution developed by the model is actually the best design.

For example, a mathematical model of an I-beam, such as used in building construction, may have fixed variables, such as its length, and several variable parameters, such as the fixed and variable loading capacity, beam weight, beam height, flange width, fillet curvature, and beam shape. Some of the parameters may be selected by the designer at the start of the design, and other parameters may be determined by the mathematical model in simulating the I-beam design. An I-beam designer can vary the values of certain input parameters, such as desired load capacity and weight, to determine how the selected input parameter values affect the I-beam design. By varying the values of the input parameters, several alternative I-beam designs will be generated by the mathematical model. Some of these generated I-beam designs will be better than others. Varying the input parameter values and order of selection of input parameters, allows the designer to evaluate many potential I-beam designs and select the optimal design for further evaluation and actual use.

It is tedious and time consuming to manually vary the input parameters of a mathematical model. There may be thousands, millions or more possible variations of input parameters to a given mathematical model. It is not practical for a human designer to manually vary the different parameters of many modern-day mathematical models. Computer executed optimization programs have been developed to vary the input parameters of computer models. By having a computer vary the input parameters, the number of simulated designs that can be generated using a mathematical models is dramatically greater than the number of designs that can be generated manually. Current optimization programs are given an initial a set of starting conditions and constraints that are used to generate a first solution to a mathematical model or simulation. Subsequent, solutions of the model or simulation are generated as the optimization program perturbs, i.e., varies, the input parameters within set constraints. By generating many, e.g., hundreds, thousands, millions, of solutions to the mathematical model or simulation, the optimization program searches for an optimal (or at least a better) solution to the model, given a set of constraints and goals the problem and solution must satisfy.

Most prior optimization techniques are limited to a specific application. These prior techniques are not generic search techniques that can be applied to a variety of different models or simulations. In the past, for example, an optimization program that was generated for a particular model such as related to a physics problem, was not applicable to optimizing a model of a chemical system. Prior optimization techniques have been created to utilize certain specific knowledge or experience of a particular system or design. There has been a need for a generic optimization system that can be tailored to a particular model or problem, by importing into the optimization system the knowledge of persons expert in the field related to the model or problem.

In addition, most prior expert optimization systems require a full knowledge base before starting an optimization search. These prior systems require an expert to establish a complete set of rules to govern a design or solution. In the real world, designers do not have a complete knowledge on which to establish an expert system or the time with which to perfect such a system. There is a long felt need for a heuristic optimization system which operates with less than a complete base of expert knowledge, and makes use of that knowledge that is available to search for a solution to a model or simulation.

In the field of optimization methods, most methods are numerically based techniques, such as mathematical mapping algorithms and mathematical extrapolations between known solution points or beyond known points. Numerical techniques often evaluate a model to predict how the model responds to changes in input parameters. The evaluations usually involve mathematical extrapolations and estimations, based on assumptions that the model will react to gradual changes in input parameters by gradually changing the output characteristics of the solution. If the solutions to a model do not change gradually with gradual changes in inputs, then numerical methods have difficulty in extrapolating between solutions of the models. For example, if certain solutions to a model are dramatically different, such as if the solution rapidly spikes to a higher value, then numerical techniques have difficulty in predicting such drastic changes by extrapolating from other solutions.

A numerical optimization method generally treats the variable parameters of a design as independent numbers that can be systematically changed. Numerical methods tend not to account for whether a particular parameter is significant to the desired characteristic of the solution. Accordingly, numerical methods may waste much time in changing variables that do not effect the solution, or that yield impractical solutions.

Another class of optimization search technique, these techniques are called "exploratory", which include genetic algorithms and simulated annealing. These two examples of exploratory techniques essentially randomly pick inputs within the specified domain and rank the resulting solutions. Those inputs with a good solution are weighted and futures guessed are made in the vicinity of the better solutions, with the idea that good solutions form neighborhoods in and around local optima. These exploratory techniques tend to require relatively large numbers of computations because the techniques are not limited to searching only the local neighborhood of the best design point.

Symbolic optimization methods rely on techniques, such as expert and rule based systems, and heuristic searches, that do not rely on mathematical formula. Heuristic techniques that have been used in symbolic optimization methods have been implemented as processes employing trial-and-error and informed guesses to search for optimal solutions to symbolic systems. Previous symbolic systems were front ends systems to numeric optimizers. In a sense, the symbolic systems steered the numerical optimization programs to solutions. The symbolic systems did not themselves perform any search, but rather directed a numerical search technique. Also, most rule systems, a type of symbolic system, tend to favor single selection of rules, even when multiple rules may apply. For example, some rule systems used a weighted random selection of rules, but only selected a single rule. DHS is not a symbolic system, but does incorporate certain ideas from rule based systems such as building and defining rules like objects, such as dependencies. DHS works with the entire set of applicable dependencies and uses each applicable dependency during each cycle.

Standard numerical optimization techniques have a variety of drawbacks that limit their usefulness. For example, present-day numerical techniques do not incorporate real-world design knowledge to provide efficient searches. Real-world design knowledge is the experience and judgment that a seasoned human designer will have developed. For example, a human designer will know based on his own experience that certain solutions are impractical. A numerical optimization technique, lacking the benefit of a designer's experience, will generate impractical solutions in a blind search for optimal solutions. Another problem is that current numerical methods do not efficiently handle the important and frequent problem of dynamic limits that result where an input constraint depends on the values of other input variables. In general, numerical methods require that additional output constraints be added for each input constraint. The drawback of this approach is that many fruitless design evaluations are made with inputs that violate bounds because they are cast as output constraints and must be evaluated before the violation is detected. It would be advantageous for numerical optimization methods to incorporate some of the expert knowledge known to experienced designers, and better handle dynamic limits that depend on one or more variable input parameters.

Furthermore, numerical optimization methods are inefficient in their treatment of design variables. In particular, numerical methods, especially many domain independent search techniques, consider all design variable parameters as equal in rank and treat the parameters uniformly. In realistic models, design parameters are not equal in rank, as some input parameters affect particular features or performance criteria of a design to a much greater extend than do other input parameters. By ranking all input variables equally, numerical techniques make it difficult to determine how each parameter affects the model and the search for an optimal solution. By treating all variable input parameters equally, numerical methods tend to waste resources in changing parameters that only marginally affect the desired features of a design. It would be desirable if numerical optimization methods would identify the parameters which most affect a desired design feature and recognize how those parameters affected the desired feature.

Another problem with numerical optimization methods is that they are susceptible to local optimas that may cause a numerical optimization method to terminate on a less than fully optimal solution. Numerical methods are usually designed to gradually move towards a maximum value, and away from decreasing values. Accordingly, a local optima, which is a local maximum value surrounded by lower values, will cause a numerical method to stop because the method is incapable of moving off the local optima to find a greater optimal value.

To understand the problem of become stuck on a local optima, it is convenient to consider by way of analogy a hill-climbing robot instructed to find tall hills by climbing only up hill. The robot is instructed never to travel downhill. When the robot reaches the top of any hill, even a small hill, the robot will stop because any further movement from the hilltop is downhill. If the hilltop that the robot is stuck on is a minor foot-hill in the shadow of a mountain range, the robot will never find the higher mountains.

Like the hill-climbing robot, numerical optimization techniques move only towards more optimal solutions and never move in a direction away from a more optimal solutions. Numerical optimization techniques can become stuck on solutions that are local optimas. Once stuck on a local optima, numerical techniques do not know how to move off that optima to find better solutions. Human designers do not generally become stuck on local optimas. A knowledgeable designer will recognize a local optima solution and move the design process onto better solutions. Designers know how and when to move in a direction away from a local optima, even if that direction initially leads the designer to less optimal solutions. It would be desirable if a numerical optimization method would also be able to move off a local optima and on to better solutions.

Another short-coming with most numerical techniques is that they assume that variable design parameters are continuous, when some real-life parameters vary only in discrete steps. The gradients used by numerical search techniques do not accommodate well a parameter that varies incrementally only in steps. In addition, numerical optimization techniques using finite difference techniques (used to approximate gradients) require that the finite differences be calculated for each parameter before starting any optimization search. Since the calculation of finite differences can greatly influence the direction of an optimization search, the use of finite differences with discrete and integer parameters will poorly approximate the gradient and result in inefficient searches.

Numerical, symbolic and exploratory optimization techniques have been combined into a type of software tool box, in which these different techniques may be applied on a case-by-case basis. The Engineous Software Company of Morrisville, N.C., has been selling its iSIGHT™ software product for optimizing designs. The iSIGHT™ provides a software suite of various optimization software techniques, including numerical techniques, genetic algorithms, and simulated annealing search tools. These techniques do not incorporate knowledge about the simulated problem or design solutions of the type that a human designer would have. To provide this domain-specific knowledge to guide the search, the iSIGHT™ software also includes symbolic knowledge-based search tools, such as expert rule techniques, that can be applied in conjunction with the each optimization technique in the tool box.

However, prior to the present invention, the search tools available with iSIGHT™ did not include techniques that provided the human designer with near complete control over a search for an optimal solution to a model. Prior to the present invention, designers were not able to direct an optimization search by identifying the most influential input parameters with respect to specific output parameters, establishing the mode of sequencing goals and parameters to be used during a search, specifying the direction that a parameter should be varied to achieve a desired result on an input parameter, and other controls that the human design can use to direct an optimization search. The present invention is a software search technique that provides a human design with tremendous control and flexibility over an optimization search.

SUMMARY OF THE INVENTION

A directed heuristic search (DHS) technique has been developed for use as an optimization techniques. DHS uses a standard problem formulation, e.g., a mathematical model, with goals, constraints and an initial starting point. DHS evaluates the quality or fitness of solutions to a model. DHS divides the search into discrete phases so that the evaluation of hard constraints, soft constraints, and optimization is done independently. This three-phase approach to optimization provides a freedom to DHS not generally enjoyed with a numerical optimization technique. In addition, DHS permits a user to define the search algorithms and modes for individual goals and dependencies. These features provide the user with much greater control and flexibility over searches, than was previously available.

Using DHS, a search for an optimal solution should initially converge on better solutions more rapidly than do standard numerical, e.g., gradient, techniques which will must first devote much time and computing resources in determining the direction in which to move. DHS moves in an improved direction by applying the dependency table and focusing the search on those parameters of the solution that have the greatest influence on a solution, and varying those parameters in directions likely to lead to better solutions. In addition, DHS maintains a log of its search paths so that a user reviewing these paths can more efficiently direct future searches by creating new dependencies and modifying existing ones.

Unlike standard optimization methods, the DHS technique allows a user to designate the variable parameters that most influence a solution to a mathematical model. DHS also enables the user to indicate the manner in which, e.g., direction, each parameter changes the solution to a model. The primary tool by which DHS enables a user to rank the influence of parameters and the direction in which they should be varied is a dependency table, that is edited by the user. In addition, DHS permits a user to specify the degree to which changes are made to input parameters, such as by selecting the step size for each change, whether the change is a percentage of the input value, whether the step size increases or decreases depending upon the success of the prior solution iteration, and whether the step size is bounded. Whereas prior search algorithms have used or generated information similar to a dependency table, these prior techniques were applied to limit the search choices made by a numerical technique and not to define the search algorithms and modes as is done in DHS. A novel aspect of DHS is that the user, by setting up the dependency table, enables the user to control the search for an optimal solution. In addition, the DHS technique tracks its solution path(s), so that a user can modify the designation of parameters to improve the efficiency of future searches.

The DHS technique conducts a focused optimization search by varying primarily those input parameters that most affect the solution in the desired manner. The input parameters may be continuous real parameters, integers or character strings. The user designates the parameters that will most effect the desired features of a mathematical model. By enabling a user to designate the dominate parameters and to indicate how, e.g., direction, those parameters affect the solution, the user applies his experience and wisdom about the design process to the DHS search.

The user designates the dominate parameters and their effect on a mathematical model in a dependency table for the DHS search. The dependency table captures the design experience and wisdom of the user to be applied in a search. DHS is a search technique that provides a user with a set of operators to direct the search. With the user's knowledge of the important input parameters and the influence (or perceived influence) that an input as on an output parameter, DHS searches for optimal solutions by intelligently varying the design input parameters. The input parameters are varied, using the dependency table, in a manner consistent with the magnitude and direction of the influence on the desired solution.

The dependency table in DHS contains a list of parameter/solution dependencies, that indicate how each parameter affects the solution to a model. Each dependency stated in the table lists the actions, e.g., direction of search, that are to be taken as the DHS varies the associated parameter. Each dependency can be represented in a dependency table having the following form.

TABLE 1

| | Dependency |
|---|---|
| Input Parameter | Output Parameter<br>Output Direction<br>(Up)<br>Action Mode<br>(Sequential) |
| X1 | Up And Down By A Step |
| X2 | Up By % |
| X3 | Down By Incremental Steps |
| . . . | Empty |
| Xn | Other Directions |

The dependency search table provides a graphical statement of which input parameters are to be changed and how they should be changed to achieve a desired directional change for each output parameter of a solution to a model or simulation. In Table 1, the dependency is the output parameter that is influenced by some or all of the input parameters, X1 to Xn. The direction in which the output parameter is to be varied is specified in the table by the user. In addition, the action selected by the user is stated in the table and directs the manner in which the input parameters are to be varied, such as by sequentially varying each input parameter one at a time. Moreover, the manner, e.q., direction, that each input parameter is to be varied is stated in the dependency table as user defined dependency vectors. The user may select the dependency vector from a variety of available actions, including without limitation up and/or down by a fixed or percentage step, increasing or decreasing the step size in subsequent iterations, and bounding the maximum change in steps. Furthermore, the user may choose that any particular input parameter has no, or only an insignificant, influence on a selected output parameter. Table 1 shows a single output parameter to be changed in one direction. In practice, a dependency table may include in additional columns for other dependencies on the same output parameter and other output parameters that may be changed in one or more directions.

The DHS includes several features that facilitate the search for optimal solutions to mathematical models. For example, DHS enables the user to set configurable logging details, that enable a user to specify the data retained regarding the search path taken by DHS during a search. By reviewing the log of a search, a user can modify the dependency tables so that future searches are more directed and more efficient, and avoid local optimas.

DHS also provides for soft constraints. Before beginning a true optimization search, DHS pushes the input variables such that they fall within any soft constraint. Once the best achievable solution values are attained or the soft constraints are met, DHS then moves on to the optimization phase and will further constrain the solutions to obey the best achieved values for the soft constraints, by treating these soft constraint values as if they are hard constraint limits. In addition, DHS uses goal programming to arbitrate between two or more conflicting goals. For example if two goals for an industrial I-Beam are to minimize the beam's weight and maximize the beam's strength, then these goals will conflict because reducing the weight will, at some point, decrease the beam's strength. The DHS goal programming approach is to apply a tradeoff mechanism, e.g., give back, that resolves goal conflicts. DHS provides the user with several ways to control the amount of effort spent on optimizing one goal at the expense of another goal(s) and provides different mechanisms for weighting the goals to prevent a goal, or at least a less important goal, from dominating other goals.

Similarly, dynamic parameter attributes may be applied as a function of other input parameter or of some external value(s) of which DHS is unaware. For example, a deadline at 8:00 p.m. for giving your boss the best possible solution that you can come up with, may be expressed as a direction to DHS to increase the aggressiveness of the algorithm by increasing the size of step changes or increasing the minimum change threshold values, as the deadline approaches to avoid spending the remaining time over optimizing one parameter without out optimizing other parameters. Another example of a dynamic parameter attribute is that DHS might incorporate another program or algorithm into its dependency table, wherein this other program or algorithm directs certain search parameters based on information held or calculations made by that program or algorithm.

DHS has one dimensional (1-D) search capabilities, in that the user can set the direction (up, down or both-ways) in which a parameter is varied during the search. The direction in which a parameter is varied is set in the dependency table by the user. In addition to setting the direction(s) in which a parameter may be varied, DHS enables a user to set other specific attributes of a variable parameter, such as setting the magnitude of the step taken with each change of the parameter, varying the parameter by a prescribed multiplier, and setting a maximum or minimum value by which a parameter can be changed. Moreover, to overcome the problem of local optimas, DHS has a provision to inject randomness into the search to create non-deterministic search functions.

The DHS provides a set of search tools that an operator selects and defines as a dependency table; scale factors and weights for parameters and goals; dynamic constraint limits which are parameter boundaries that are a function of other input parameters or some other external value; parameter specific attributes (e.g., size of each stepwise change made to a parameter, where the step change may be a constant value, multiplier applied to the parameter or some other function, and minimum and maximum changes that may be made to a parameter), and a give back mechanism in which trade-offs are set between goals. In selecting and setting up each of these search tools, the operator applies his experience and knowledge about the solution and the design to the search criteria. These DHS search tools are configured so that an operator has tremendous flexibility in defining and directing a DHS search.

In addition, the DHS search tools are provided and arranged in a manner that an operator can understand how the search is to be conducted and understand how the operator settings will affect the search. By enabling an operator to define search criteria, select which and the order of variables and parameters to be varied, and set search directions for individual parameters and variables, the operator has tremendous control over the search process itself. Prior optimization search techniques did not provide the user with much flexibility to direct the search process and were not conducted in a manner that was readily understood by the operator. In contrast, DHS gives an operator wide flexibility to define a search while maintaining the search process to be a relatively easily understood process.

DETAILED DESCRIPTION OF THE DRAWINGS

Figure 1:
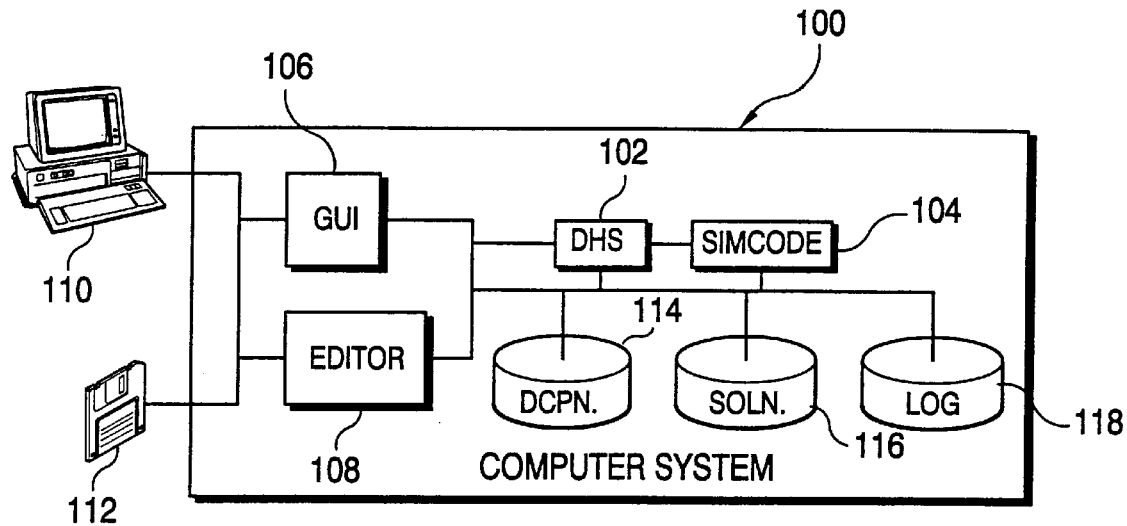
FIG. 1 is a block diagram of a computer system embodying the current invention.
Figure 2:
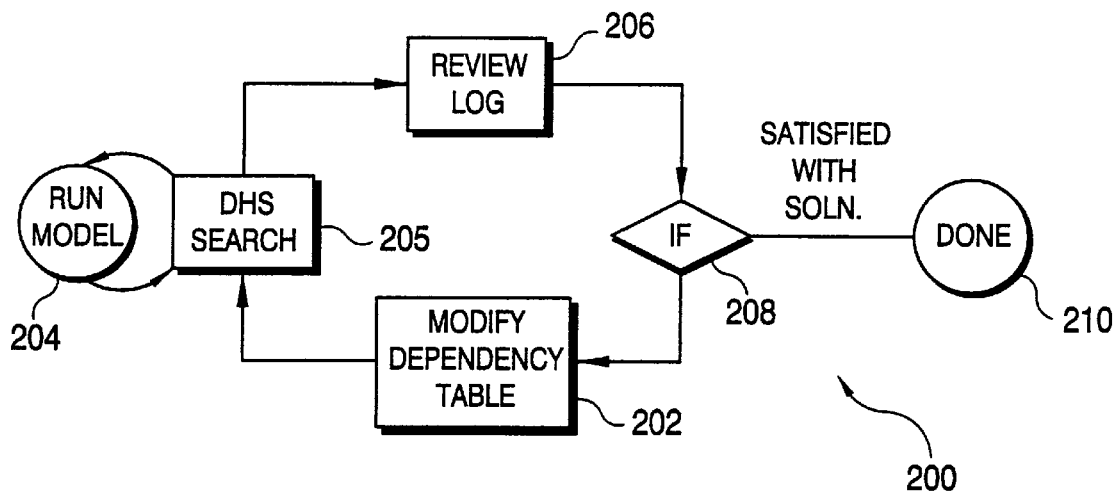
FIG. 2 is a diagram of the process flow of a directed heuristic search.

FIG. 1 shows a block diagram of an exemplary computer 100 system embodying a directed heuristic search (DHS) algorithm 102. The computer system may be a personal computer, a mainframe or mini-computer, a network of computers or other computer system capable of executing programs of simulation codes (simcode) 104 of mathematical models, and optimization search programs, such as a DHS, for exploring a range of solutions to the models. A computer system that may be used for DHS is Sun Micro-Systems Inc., Sparc Ultra I, Hewlett Packard, C160, Silicone Graphics Indigo 2, PC/Windows/NT, Digital Equipment Corp., Vax/VMS.

The computer system 100 may also include a graphical user interface (GUI) 106, such as the X11/Motif, Windows/NT or the like, which presents in graphical and/or text information generated by the computer system or being entered into the system. An editor program 108 enables the user to enter, modify and delete data associated with the DHS and simcode. In addition, DHS may be used in conjunction with other search tools, such as is provided by iSIGHT™. The user interfaces that work in conjunction with the GUI may include display monitors 110, printers and other output devices, and user input devices as a keyboard 112, mouse, drawing template scanner, and other devices that enable an operator to input information to the computer. In addition to the modules show in FIG. 1, the computer system 100 may include or be associated with a variety of other modules and components, such as modem or networking connections to other computer systems, memory storage systems, computer-aided-engineering design systems (CAE), and other computer systems known to persons of ordinary skill in the art.

An editor program in the computer system 100 allows the user to enter information regarding the user's knowledge and experience in designing the systems that are mathematically modeled with the simcode 104. The user reviews and inputs information from and to the databases that support the simcode model 104 and DHS 102. These databases may include the dependency table data 114, solution data 116 describing design solutions previously developed with the simcode model 104, and log data 118 of the steps taken by the DHS in searching for past solutions (including unacceptable or impractical solutions) of the model.

DHS 102 is an enhanced optimization technique for perturbing the variable parameters of a mathematical model, as expressed in a simcode 104. The perturbations of the model by DHS are directed based on the knowledge and wisdom that the user imparts to the search by setting the parameter dependencies in the dependency table of DHS. The user sets ups and modifies the dependency table 202 to provide directions for the search. The dependency table and other user inputs provide the starting parameter values for running the simcode 104 model and generating a first solution. The DHS 205 changes one or more of the input parameters of the model and reruns the model 204 repeatedly. By changing the parameters of the model, DHS conducts a systematic search for the various solutions of the model to find a optimal solution. Using the dependency table, DHS starts its search on those parameters that have the greatest influence to achieve the desired goal(s), and intelligently directs the search toward that goal(s). In addition, DHS provides a log of the steps it took in searching for a solution that allows the user to analyze the search process 206. After analyzing the search process, the user decides whether a satisfactory solution has been generated by the system 208, and if so the process is completed 210. If the user decides to continue the search for an optimal solution to the simulation or model, the user can modify the dependence table to incorporate the experience gained by past solutions 116 and the knowledge gleaned from the log 118 of prior searches.

Figure 3:
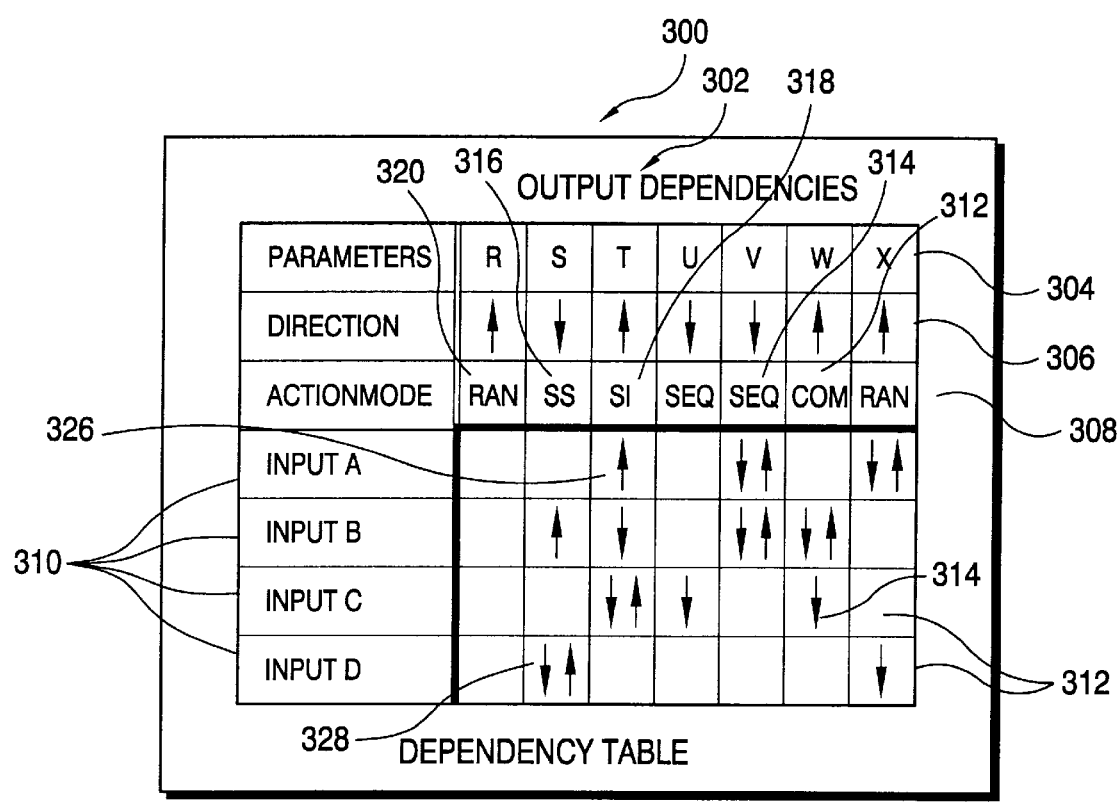
FIG. 3 is a diagram of an embodiment of a dependency table.

FIG. 3 shows an exemplary dependency table 300 for a DHS search. When all of the output parameters dependencies are view together in columnar format they form an dependency table (or inference diagram). This table gives the user a pictorial view of the relationships between the input and output parameters. The dependency table shows graphically how input parameters 310 are believed to effect output parameters 308. In the dependency table, output parameters 302 (or dependencies R, S, T, U, V, W and X) are aligned in a top header row and separated into columns. The rows 310 of the dependency table (other than the header rows 304, 306 and 308) relate to the input parameters, inputs A to D, to the model. The second row 306 of the dependency table, which is a second header, represents a direction of movement for the above corresponding output parameter. If a single output parameter is to vary in two or more directions, then the output parameter is assigned to two or more columns. The directions up and down for input parameters 314, 312, 316, 318 are merely used for descriptive purposes, and the movement of an output parameter may be any two or more dimensional movement of input parameters or change of a particular dependency.

The third row 308 of the exemplary dependency table 300 shows the action mode 320 which controls the manner in which the DHS search will apply a change to a particular dependency. The dependency search modes may be, for example, compete (Com. 312), sequential (Seq. 314), simultaneous separable (SS. 316) simultaneous-inseparable (SI 318) and random (RAN 320). The compete mode 322 is performed by the action that all inputs that affect the dependency of the column get evaluated from the same initial point and the best improvement choice is taken. Each input parameter is varied starting at a respective initial point and the input that achieves the best overall gain in the output towards the goal is chosen as the best point. The next applicable dependency can be then used or the same dependency can be rerun. The compete mode is an automated competition for the best overall action for the dependency of that column. As an example, the compete mode can approximate a conventional numerical gradient approach, but the compete mode is limited to a one-directional change of input parameters.

A sequential search modes 314 is a linear traversal of all the appropriate actions of each input parameter, trying them back to back with cumulative starting point improvement. In a sequential search, each of the inputs that affect a dependency are varied one at a time and in sequence with the other inputs being held constant. With each series of changes to an individual input parameter, the best input parameter setting is selected to begin the next sequential series of changes of another input parameter.

The two simultaneous search modes (SS) 316 and (SI) 318 are similar in that they both apply all the changes to all influential input parameters before evaluating the simcode results for the best solution from all of the input variations. The simultaneous action modes are what allow DHS the freedom to move in non-orthogonal directions, which can be an advantage. For example, if a hill climber desired to climb a mountain ridge, then consider yourself sitting at the origin in the x,y plane. There is a ridge climbing to the northeast at a 45 degree angle. Any motion in just the X or Y direction will result in a downward direction. The only way to climb the ridge is to move x and y at the same time to travel non-orthogonally up the ridge.

The difference between the two simultaneous modes is manifest when one or more input parameters reach or exceed their boundary condition. In the case of a separable simultaneous mode 316, when the action of changing the value of an input parameter takes that parameter beyond a boundary condition, then that action is not performed and no further changes are made to the dependency to move in the direction towards the boundary condition. While no further changes are made in that direction, the dependency remains active and may be changed in other directions. However, with the inseparable simultaneous mode 318, the entire dependency (in any direction) is not further varied and is skipped when the input parameter reaches a specified boundary condition.

In the random mode 320, a random sequence is used individually to vary each of the input parameters that are designated as influencing the corresponding output parameter in a given direction. The action mode is selected by the user. Accordingly, the user directs the search mode for each output parameter that the user believes will best optimize the solution. For example, the cell 326 shows that the input A is to be varied in a up-direction to influence the output parameter T in an up-direction. To indicate that an input parameter has a direct effect, a vector arrow is shown in the cell. Other cells in the dependency table show no vector arrow for particular dependencies, which signifies that a movement of the corresponding input parameter does not (or is not believed to) affect the corresponding output parameter.

In addition, the vector in a cell may have a vector symbol other than a simple up or down arrow to signify that the direction and type of change to the input parameter to achieve the intended or desired change of the output parameter. For example, cell 328 contains an up and down arrow vector indicating that the input parameter D should be changed in both (or all) directions to vary the dependency S. Moreover, if the operator does not which way to vary a particular input parameter, the operator can set the cell to vary the input both up and down. The use of the up and down vector may be set initially by a user who suspects that a particular input parameter affects an output dependency, but the user is unsure of how or in which direction the input parameter will affect the output. Later, when the user reviews the results of earlier DHS searches he may reset the vector in cell to reflect a single directional change that he learns is the proper direction to vary the input to achieve the desired directional change in the output.

The cells state the action to be performed on each input parameter for a corresponding output parameter. In particular, the cells indicate the direction and how an input parameter is to be changed to influence the corresponding output parameter in an intended or desired direction. Setting the expected direction and action, referred to here as a dependency vector, for cells allows the users to indicate the direction that an input parameter is to be varied to achieve a desired move in an corresponding output parameter. By setting the directional vectors in the cells, the efficiency of the DHS search can be improved by directing the search in those directions that are believed to provide the best solutions. In addition, the search can be directed to avoid solutions that may have an artificially-high overall objective value, but which solutions are known to be invalid and should be rejected. This feature of directed searching of input parameters and dependencies is useful in avoiding certain areas in the solution space of a model or simulation with known problems.

The order of the actions in the dependency is derived from the action weights. The action weights (not shown in FIG. 3) are assigned by the operator to each of the dependencies and, may be assigned to input parameters. DHS will act first on the dependency that has the highest weight for the desired result, and then move to the next most weighty dependency, and so on.

Organizationally, DHS performs the first part of its search by selecting the applicable dependencies to apply for a search, in an order prescribed by the user and/or DHS. The dependency table allows the users to direct an optimization search and indicate how DHS is to use the dependency rules when performing the search. In setting up the DHS search table, the user determines the goals, constraints, mode of searching and the order of searching by, for example, indicating the user's preferences in the dependency selection mode and weights portions of the table.

During a search, DHS selects a goal or constraint to optimize and searches the dependency table for dependencies applicable to the selected goal or constraint. The goals and constraints may be ordered based on user settable options, such as weighting factors. The dependencies for a given goal or constraint may be ordered or ranked, based on various user configurable options set in the dependency table. Within each dependency there are a set of search actions to perform. These actions and the action mode as indicated in the table, inform DHS how to, for example, control a best pointer pursuer type search for that particular dependency variable. A pointer pursuer type search is similar to a hill climber type search, except the pointer pursuer does not have the continuity requirement that exists for a hill climber search. DHS is not limited to a particular search mode, and may provide a mulitmodal searches.

The DHS search process is subdivided into three phases. In phase one, the hard constraints imposed on the solution (or dependencies) are satisfied by changing the dependencies of outputs that violate constraints until the hard constraint(s) is met or no further improvement can be made within the confines of the constraint. Constraints are usually boundary conditions, on output parameters with upper and lower bounds, e.g., the mass of an I-Beam must be between 3 and 5 Kilograms. During phases one and two, DHS acts to satisfy the hard and soft constraints, and in phase three DHS searches for the optimal solution that best achieves the goals stated for the solution. In contrast to constraints, goals are objectives for the search, such as to reduce the weight of an I-beam as much as possible.

DHS begins phase two of its search which is to process soft constraints, in a manner similar to that done for hard constraints. Soft constraints are constraints that do not have to be satisfied. They are ideals, but the best attainable value of a solution is acceptable if not satisfied. At the end of phase two, DHS converts the soft constraints into hard constraints that are fixed to the best achieved value or constraint limit for each soft constraint. The focus of phases one and two in DHS is to satisfy the constraints on a solution, but the solution need not be optimized during phases one and two while satisfying the constraints. During phase three, the solution is optimized by DHS by searching for the best solution within the boundaries of the constraints that have been satisfied. During phase three, DHS optimizes the solution by using the dependency table to vary the inputs for each goal. In addition, DHS arbitrates between conflicting goals using the selections made by the user in the dependency selection mode attribute for the goals. At the end of phase three, DHS has optimized a solution with respect to the constraints and goals set by the user.

Throughout all the phases of the search, DHS at the end of each goal optimization updates a floating hard constraint known as "give-back". Give-back is a value assigned by the user that DHS may apply to move a particular output parameter or goal from its best value to a less-desirable value to improve the solution with respect to another goal or dependency. The default give back is infinity, but the user can select a value for give-back in setting up the search. The upper bound constraint limit for give-back is set at the current value of the parameter plus a give-back value and the lower bound for the constraint is set to the current value of the dependency minus some give-back value. Give-back prevents DHS from considering any future solution where this goal is greater than the give-back constraint value. For example, a model of a martian lander may have conflicting goals of reducing weight (mass) and achieving a certain strength to withstand landing. If the model had run for three weeks to reduce the mass of the Martian lander, the give-back constraint value may be that up to two thousand kilos of weight may be added to the lowest weight solution for the lander to satisfy the landing strength requirements. By specifying the give-back limits, such as the number of kilos that can be added to the lander to satisfy the next goal or constraint, DHS is directed by the user as to how to arbitrate between conflicting constraints or goals.

Figure 4:
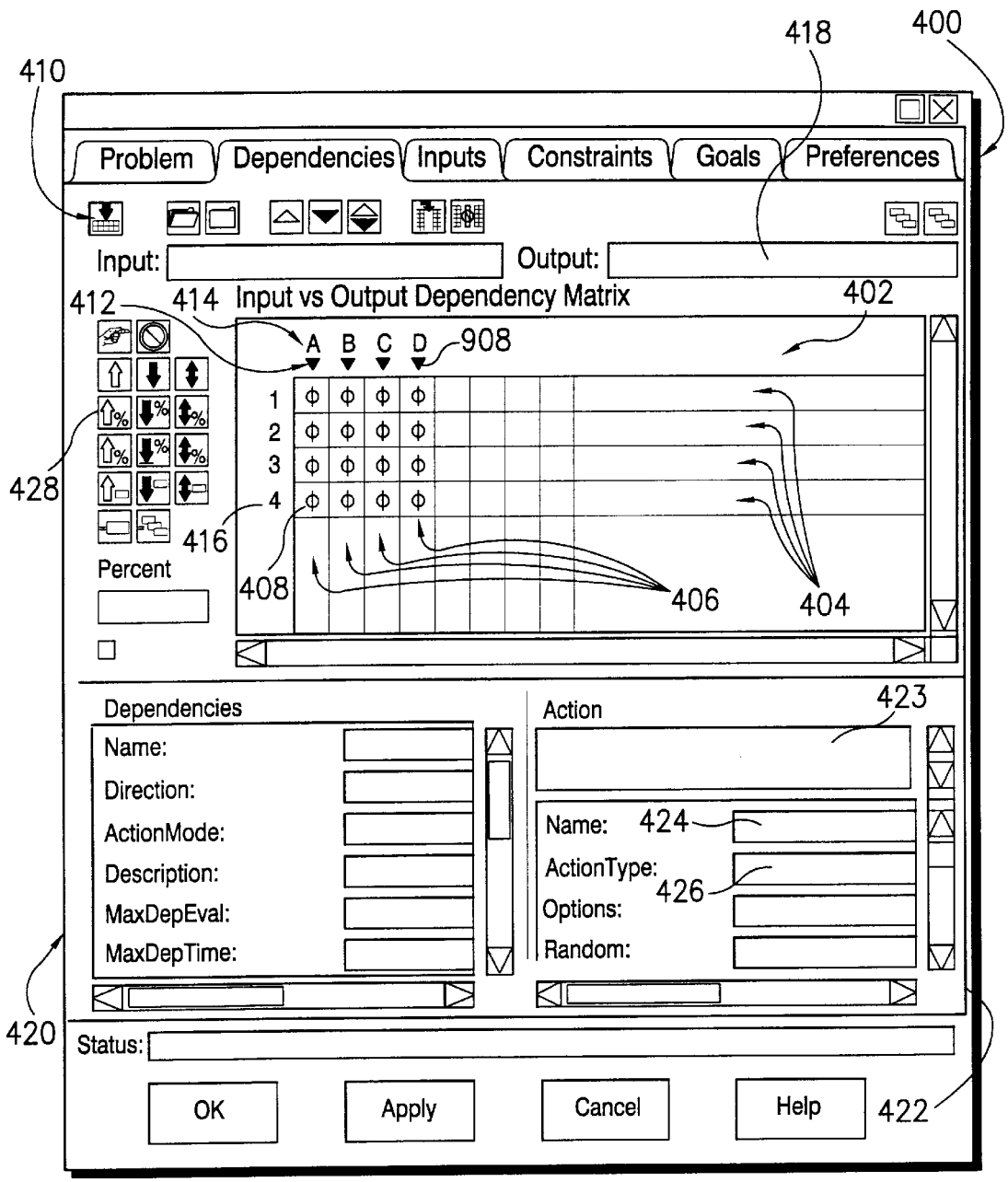
FIGS. 4 to 9 are a series of display images that show the operation of a exemplary DHS search process and setup.

FIG. 4 shows a representative dependency table, as shown in an exemplary window 400 of a monitor display in a computer system executing DHS. The dependency table 402 is shown in a state before a user sets the direction and magnitudes of dependencies, and other variables of a DHS search. The dependency table has rows 404 for each of the variable input parameters, e.g., 1, 2, 3 & 4, to the model or simulation. In addition, the table has columns 406 for each of the dependencies, e.g., output parameters. The rows of inputs and columns of outputs form a matrix of cells 408, where the rows and outputs intersect. Each cell can be set by a user to indicate how the corresponding input parameter influences the corresponding output parameter.

The cells 408 for the table 402 shown in FIG. 4 are filled with Phi ($\phi$) symbols, which in this embodiment represents that no dependency vectors have been entered to the cells. As shown in FIG. 4, the dependency table has not been set up by the user and there are no entered dependency vectors. The user will enter into selected cells the influence, e.g., dependency vector, that functionally relates the input parameter to the corresponding dependency. The user may also add new more than one dependency for each output parameter if desired. If the user does not enter a dependency into a cell, then the cell indicates that the input parameter does not influence the corresponding dependency. If nothing is entered for an entire dependency column, then DHS will vary every input variable to move the output parameter. One of the advantages of DHS is that it limits the search of goals to just the dependencies that affect the goal, and the search of dependencies to only those input parameters which are indicated in the dependency table as influencing that dependency. DHS will not vary the dependencies or input parameters that are not indicated as having an affect on the goal or dependency being optimized. Moreover, DHS can search even if the dependency table is only partially completed. The user may not know how every input parameter affects each output parameter. The user may set up the dependency table with the dependency information that is known, and DHS will conduct a search.

In addition to the dependency table, FIG. 4 shows several tools for setting up the dependency table. These tools include a tool bar 410 that has function keys that act on the dependency columns in the table, including a key to select dependencies, to close and open folders of dependencies for a model or simulation, and to add and delete dependencies in the table. In addition, the direction of dependency 428, e.g., up by step, up by percent, down, up-and-down, etc., may be selected and the directions 412 are indicated on the table below the dependency 414. To setup the dependencies, the user inserts or deletes dependencies (e.g., columns) to the table using the tool bar.

Once a dependency column 414 has been entered to the table, the user designates which of the input parameters 416 influences the dependency by selecting the cell 408 corresponding to a selected input parameter and corresponding dependency. When a cell is selected, such as by using a mouse pointer, the names of the input and output (dependency) for the cell are displayed in text boxes 418.

The attributes associated with a dependency output parameter are shown in a dependency edit panel 420. The dependency edit panel shows the name and direction of the dependency, which is the same information as shown in the output text box 418 and above the column for the dependency 412. In addition, the dependency list states, in editable form, the action mode for the dependency which specifies how the actions to be performed on the input parameters dependency are to be processed. Exemplary dependency actions are sequential, sequential complete, simultaneous separable and inseparable, and random, which are described above. The dependency list allows users to enter a description of the dependency, and to set limits for the number of times that the model or simulation may be run while optimizing the dependency and for the time dependency allotted to optimize the dependency. Additional settings that a user may select for each dependency include: to specify that the actions as specified in the dependency table will if applied in reverse have the opposite affect on the dependency; that if a threshold minimum gain, e.g., percentage improvement, is not achieved in an iteration of the search, then the search terminates permutating the current dependency and continues to the next dependency; and that a weight is to be applied to the dependency in ranking it with other dependencies to order the dependencies to be searched.

An action edit panel 422 is displayed for a selected cell, e.g., highlighted on the display by the user, that shows the actions to be performed on the corresponding input parameter to influence the corresponding dependency, e.g., output parameter. A action list 423 describes the action to be performed. The edit box 422 states the name of the input parameter, 424, corresponding to the highlighted cell. The action type box 426 displays the direction vector for the cell corresponding to the named input. The actions for the cell are selected from a tool palette 428, that for a particular cell, allows the user to select actions, such as to vary the input parameter up and/or down by a step increments, up and/or down by percentage values (with and without bounds to the value of the percentage change), and to fix an input parameter to a certain value. The step changes can be variable steps, such as to double a step change on another iteration. In addition, where step or percentage changes are to be applied to a parameter, the change can be randomized within maximum or minimum limits.

The action edit panel 422, also permits the user to handle boundary conditions by specifying what action is to be taken if the boundary is to be exceeded, such as to preclude exceeding the boundary condition. The action panel can be also used to set limits: on the number of iterations to be performed on the model or the amount of time used to vary a particular input parameter to improve the corresponding dependency; on the maximum and minimum changes to the action for the selected dependency vector; and a threshold minimum relative gain in the improvement achieved in an iteration of a solution, below which gain DHS will move to vary another input parameter for the dependency. In addition, the user can specify a weight to be assigned to the action, relative to other actions for the particular dependency. The weight of an action is used in determining the order in which vectors and are changed during the search of the dependency. Moreover, the action mode may allow a user to select different search strategies to be applied to the dependency and/or dependency vector. One such search strategy is to move a solution only forward to better results never to worse results, such as in a hill climbing mode.

Figure 5:
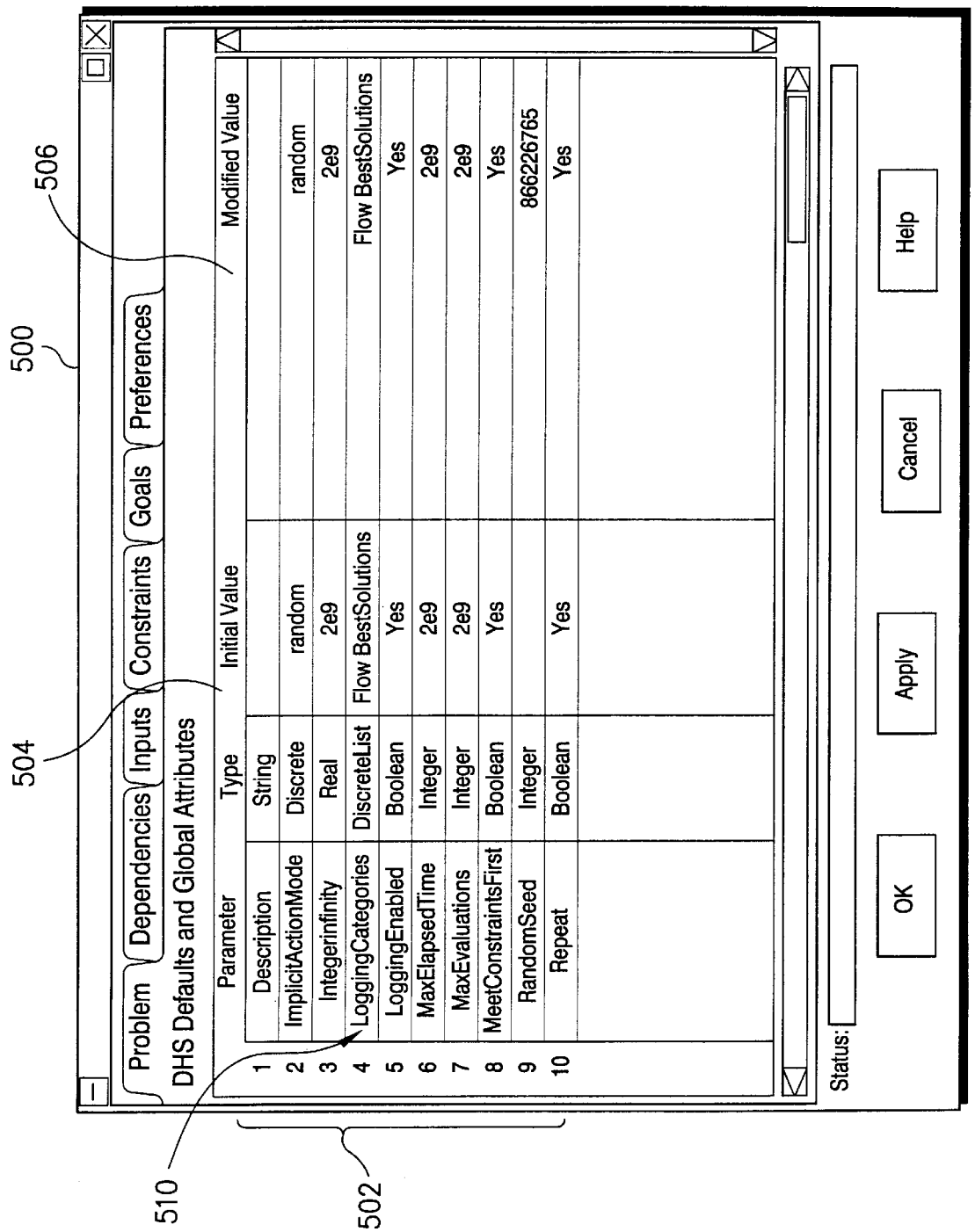

The dependency table shown in FIG. 4 is only one of the overall setting window displays that a user can determine in DHS. The user also may specify the problem attributes (see FIG. 5) to be globally applied during the DHS search, the input parameters (FIG. 6), constraints on the search (FIG. 7), goals for the solution (FIG. 8), and display preferences (not shown).

FIGS. 5 through 9 assist in the explanation of DHS and these other user directed conditions. These figures show values that relate to a mathematical model 1000 of a structural I-beam 1001, shown in FIG. 10. The equations 1002 that form the mathematical model of an I-Beam relate several input parameters, such as beam height (h), flange width (fw), flange thickness (ft) and web thickness (wt), to several output parameters, i.e. dependencies, including beam mass, beam deflection and beam stress. The I-beam model 1002 is merely applied for purposes of illustrating DHS, and does not necessarily represent that the model is an accurate physical description of a true I-beam. The I-beam model is converted to simulation code (104 of FIG. 1), and loaded into a computer system having a DHS search process 102.

A user, such as an I-beam structural engineer, of the computer system having the DHS search process and the simulation code for the I-beam model, sets up the search conditions, dependencies, goals, etc. by interacting with the display screens shown in FIGS. 4 to 9. With respect to the setting of defaults and global attributes 500 shown in FIG. 5, the user defined several configuration settings 502 for the I-beam model search. An initial value column 504 may be used to automatically establish default values for the configuration settings, which defaults may be overwritten by the user as modified values 506. For example, the user can provide a text description of the particular DHS process to be applied to the I-beam model. The user may also define the action mode 508 for implicitly generated dependencies, such as whether the implicit dependencies are to be randomly searched or that these dependencies are to be sequentially searched.

The logging categories 510 are a set of selectable attributes of the history taken of each DHS search path. For example, the user can set the logging categories to report on: the implicit dependencies created by DHS for goals and constraints not specified by the user; how well each objective was achieved that the user did select; traces of the search path taken by DHS and the changes made to each variable during the search, including details that explain why each change was made; the reason why each optimization loop was terminated during the search; each optimization loop for goals and dependencies made during the search; run-time statistics; solutions attempted, with real-time prompts when better solutions are found, and details of best solutions found during a search; and other historical details of the search. Because the user has the ability to define how the DHS search will be logged, the user can ensure that the historical information of a search that is needed to review the search and improve future searches is reported by DHS.

The user may also set other defaults and global attributes 502, including the value of infinity used during the search, maximum time allotted for the search and maximum number of evaluations of the I-beam model allowed for the search; whether a first attempt should be made by the search process to meet the constraints before starting phase three of the DHS search; whether to apply a random seed value in an input value or elsewhere when rerunning a DHS search to test whether the same solution is obtained, and repeating the search when the DHS would otherwise terminate an optimization loop because the minimum threshold gain has been passed.

Figure 6:
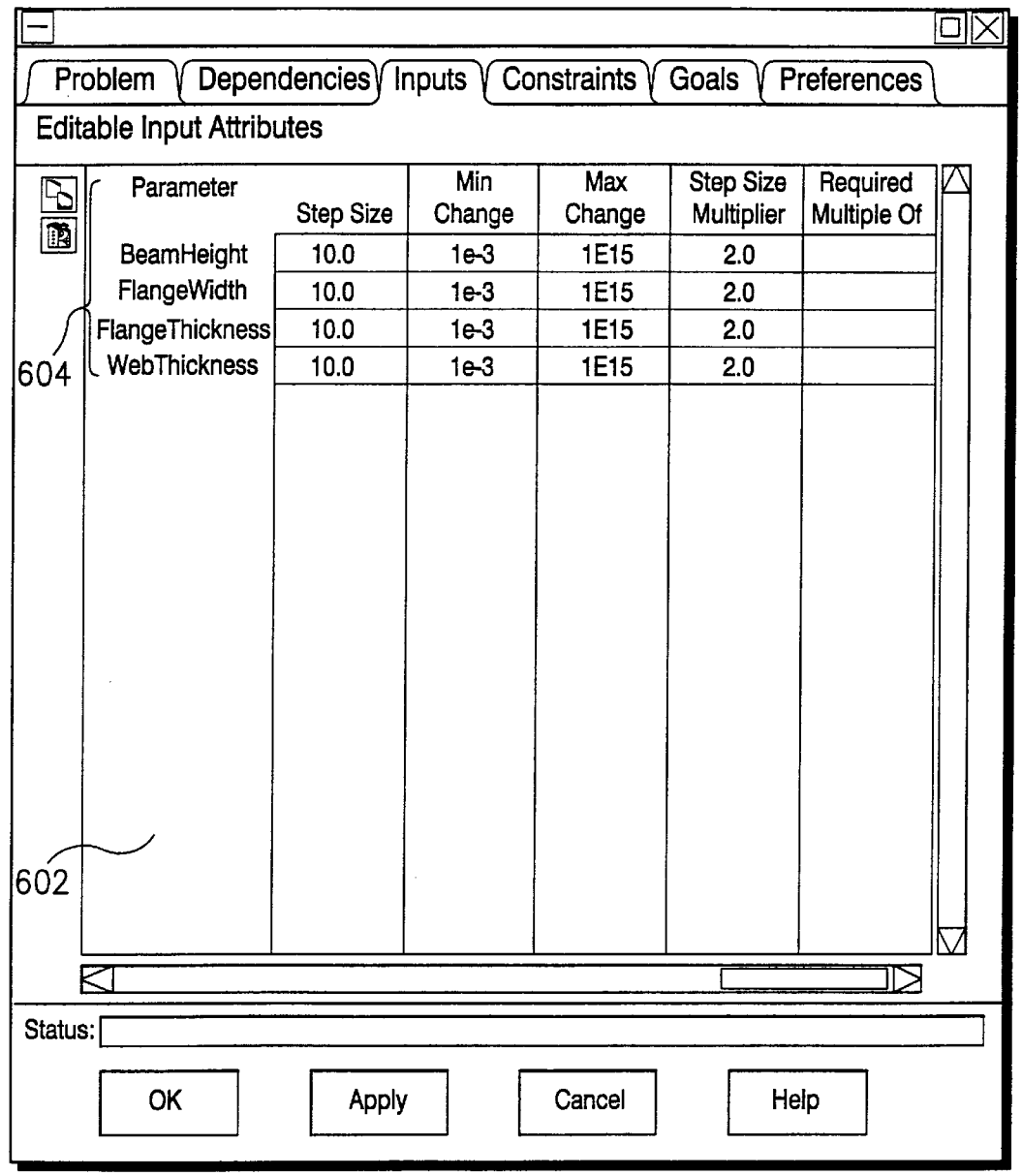

The user next completes an input parameter window 602 to set the values for the input parameters 604, as is shown in FIG. 6. For each of the input parameters, the user may set the step size change used to vary the parameter during the search, establish minimum and maximum changes to be applied to the parameter, set a multiplier to be applied to subsequent step change(s) when a current step change successfully influences the dependency value or to be applied as a divisor if the current change is unsuccessful, and a required multiple value, if each change is required to be a multiple of some value.

Figure 7:
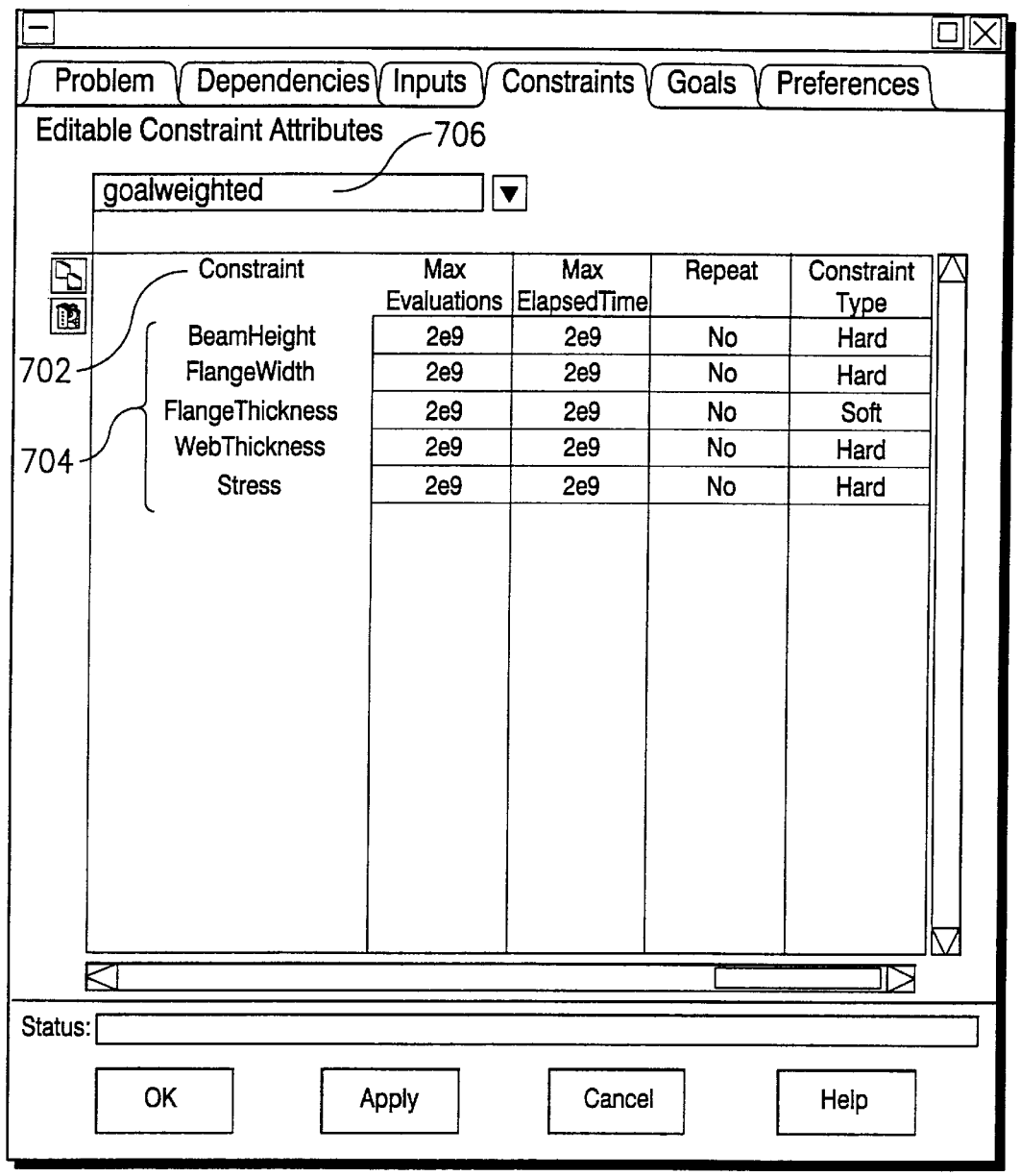

As shown in FIG. 7, the user next sets the constraints 702 to be applied to the input and output parameters 704. For each parameter, constraints may be set such as a maximum number of evaluations and time for DHS to evaluate the parameter, whether the constraint is hard, in which the constraint must be satisfied, or soft, and whether DHS is to repeat its search using the parameter after passing the threshold minimum gain. In addition, the user can select how conflicts between constraints are to be handled by designating the manner in which tradeoffs are to be made. Generally, DHS avoids conflicts with constraints by sequentially satisfying each constraint in an order selected by the user. For example, the user may select a goal weighted approach 706 in which each constraint and dependency is weighted, and the weight of each is used to determine the order in which each is evaluated. The highest weighted constraint may be evaluated first, and dependencies related to that constraint are evaluated in order of their weight. Another mode of searching is "goal weighted and random dependencies", wherein the conditions are satisfied in order of their weight, but dependencies are optimized in a random order. The search may be by a combined weight, in which the dependencies are ranked by the product of each dependency weight and its corresponding goal weight. In addition, the search can be randomly organized wherein the sequence of constraints and dependencies is a random order. A variant of a random search sequence, is to randomize the order of the products of dependency and goal weights, and evaluate the dependencies in that order.

Figure 8:
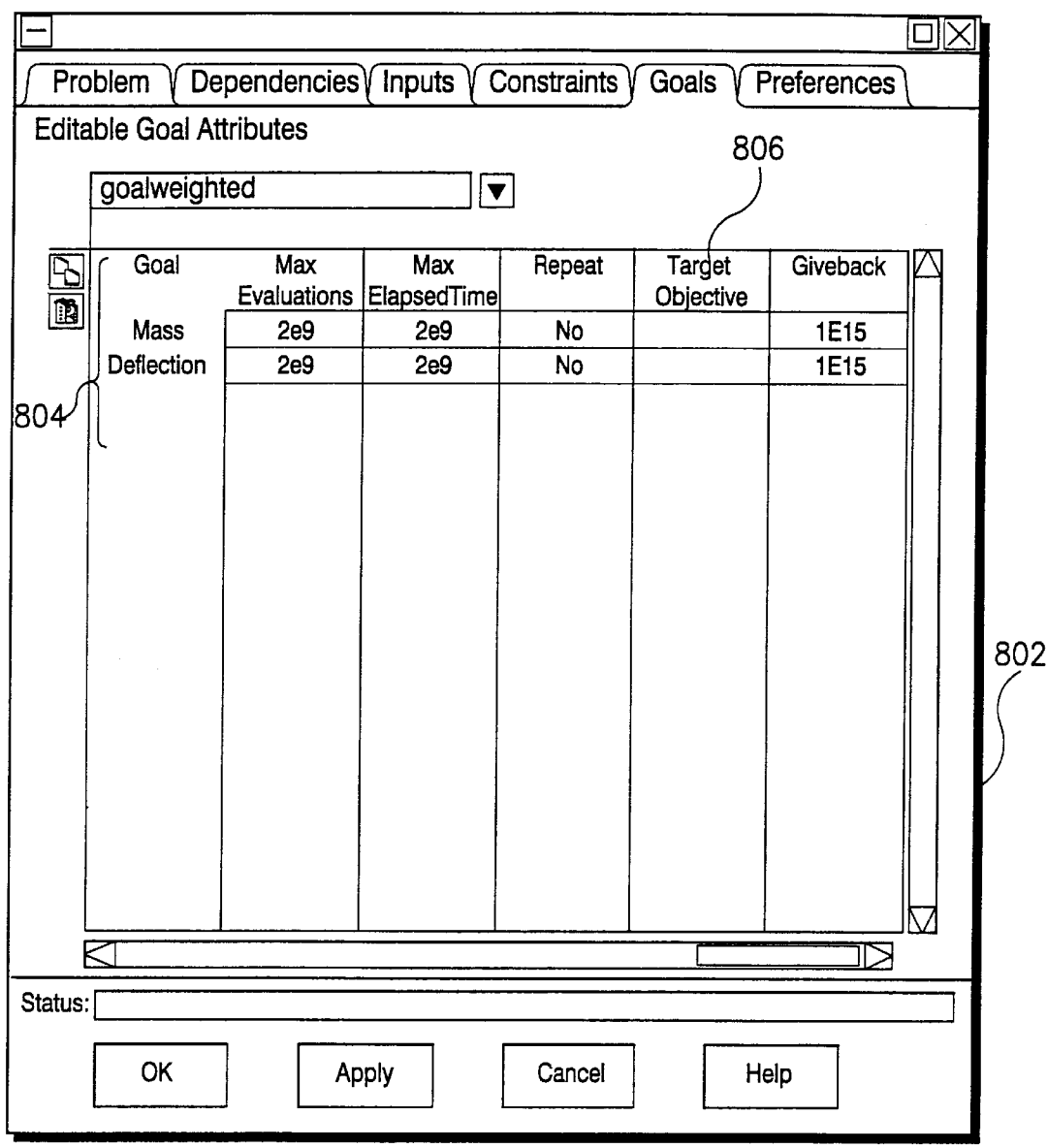

FIG. 8 shows a window box 802 for the goals 804 for the solution to the I-beam model. These goals are selected by the user and DHS applies these goals (and the conditions—which are treated as goals—shown in FIG. 7) in searching for optimal solutions to the model. The goal(s) selected by the user is a desired result for the solution, such as in the I-Beam example, that the mass and deflection of the beam are to be minimized. Several of the selectable attributes of the goals are the same as those described above for constraints. In addition, goals may be given other attributes such as "target objective(s)" 806 which sets a criteria that is desired for an optimal solution to the model. Target objectives are "soft" constraints, in that the designated criteria is a fixed value to be used in conjunction with the goal, such as in minimizing the deflection of the beam, the target is a deflection value of "12". In addition, multiple-goals each have an associated "give back" value which states the amount by which a optimal solution for a particular goal may be reduced, to satisfy another goal. For example, a give back may be that for the goal of reducing the weight (mass) of the I-beam, no more than 2 Kilograms is to be given back from a solution having the lowest weight to satisfy some other goal.

Figure 9:
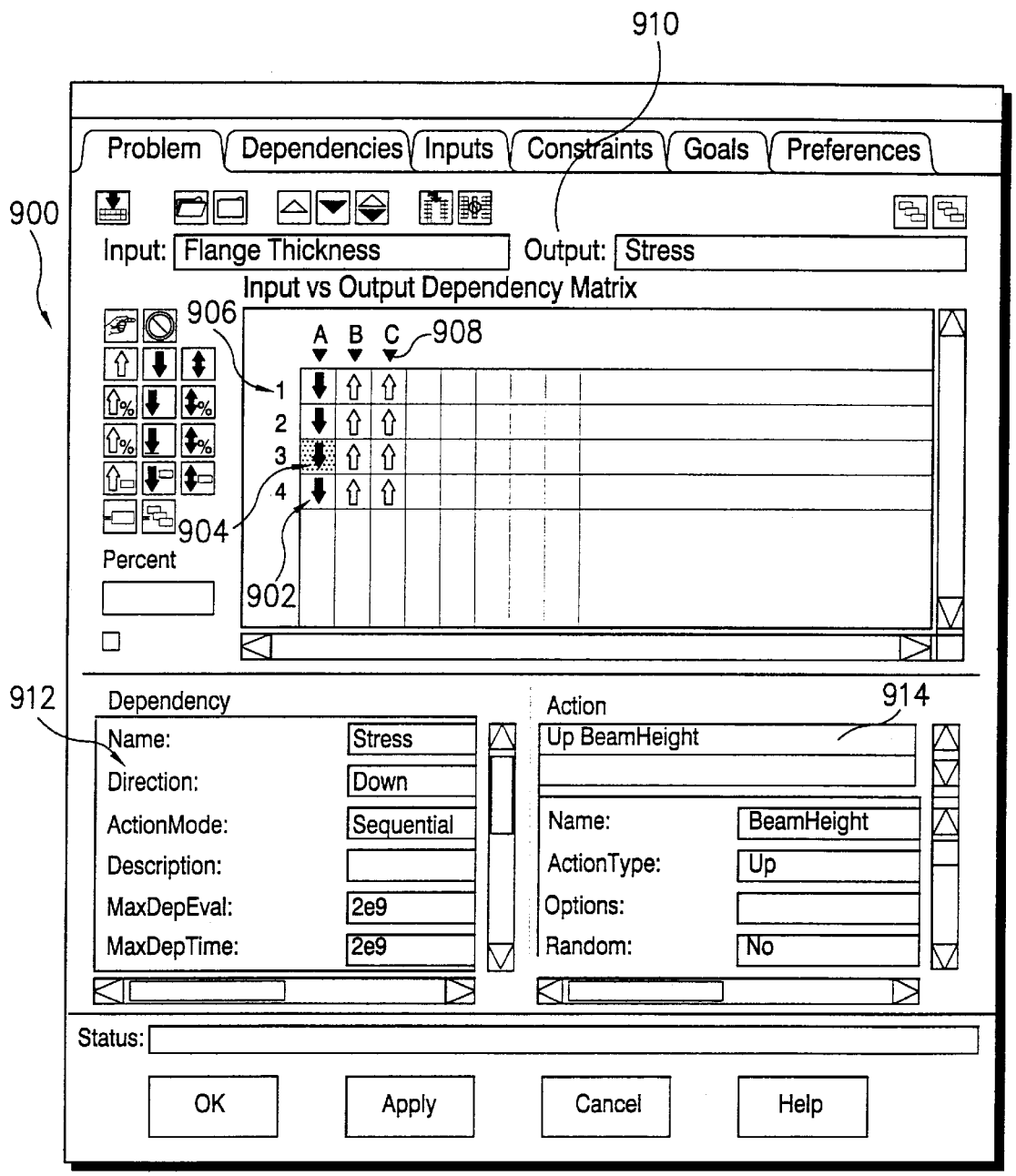
Figure 10:
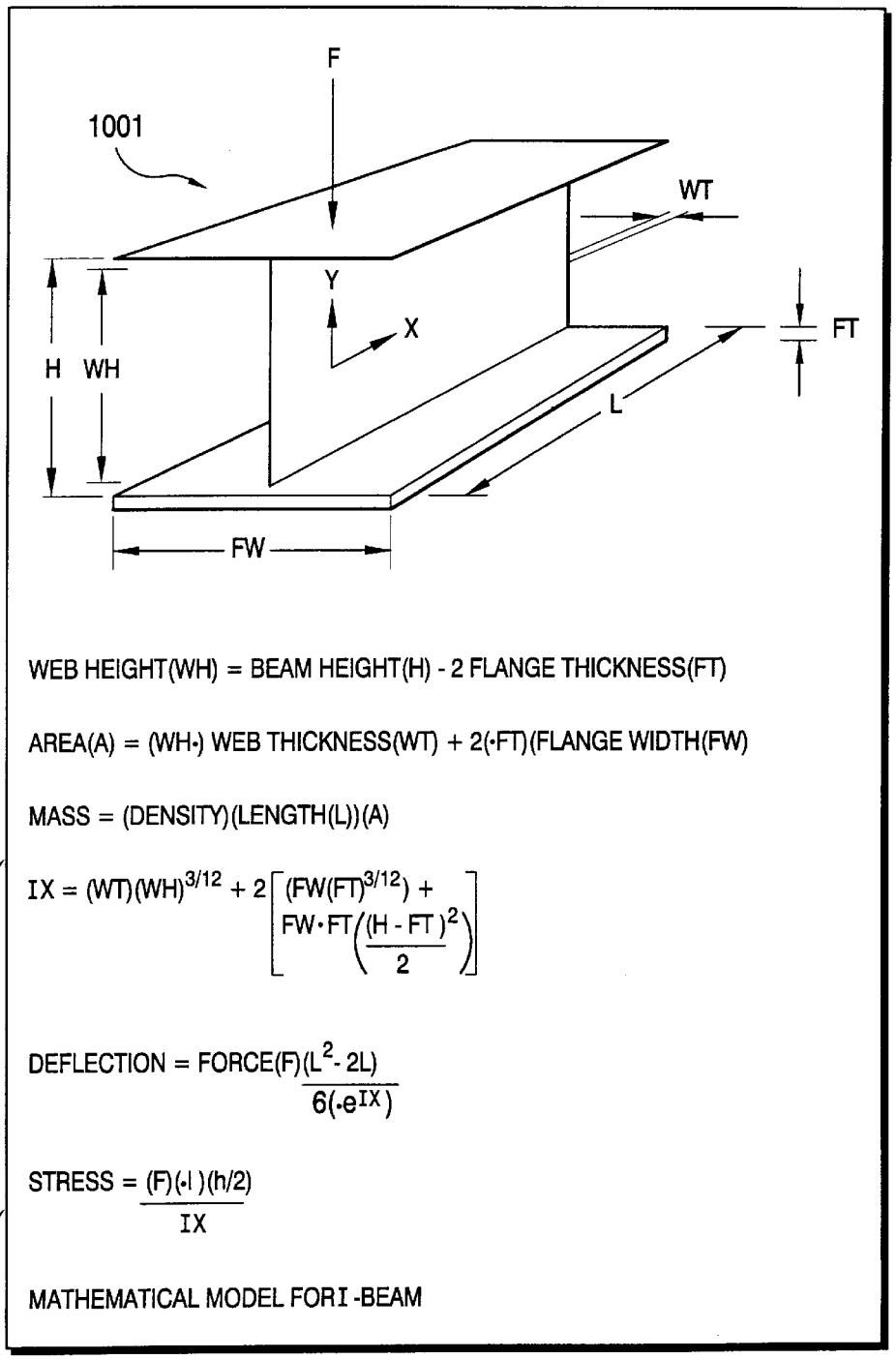
FIG. 10 is an exemplary mathematical model for an I-Beam design.

FIG. 9 shows a completed dependency table window 900, in which the user has entered a dependency action, e.g., vector, 902 into each cell 904 of the table. In this I-Beam example, a vector is specified for each cell, which indicates that every input parameter 906 influences each output parameter 908. However, DHS does not require that every input parameter influence each dependency, and each cell is not required to have an action, e.g., a vector. In this example, the I-beam model is set up such that each input parameter influences each output parameter. The attributes of the highlighted cell 904, are shown in the input and output text windows 910, and the dependency list 912 and action list 914. In this example for cell 904, the input parameter (no. 3) is the flange thickness and the output (label A) is the stress of the I-beam. As shown by the arrow under the A, the desired direction of movement of the weight output is down to a low weight.

The dependency panel 912 shows the "stress" dependency. The user can edit the dependency panel 912, and corresponding action list 914, to direct the DHS search by incorporating into the table the knowledge that the user has regarding designing I-beams. An engineer who designs I-beams will be familiar with the equations which govern I-beam design and would have an inherent knowledge about which input variable(s) to change to get the desired output. With respect to the I-beam model (1002 in FIG. 10), the goals are to decrease the value of all of the output values, e.g., stress, mass and deflection, and not to intentionally increase the value of any output variable. Accordingly, DHS should not evaluate I-beam dependencies that move any output to a greater value and thus only dependencies shown down arrows are illustrated in FIG. 9.

In setting up the dependency table, the user provides DHS with two types of information which are: (1) the relationship between input and output parameters (see the equations for the I-beam model and the dependency vectors), and (2) the goals, dependencies and input parameters to change first, i.e., by weights. To fill in the dependency table, the user applies his understanding of the general behavior of the model equations which govern the relationship between the inputs and output parameters. In general if the input parameter is in the numerator of the equation for the dependency, the input has an UP relationship with respect to the dependency, and an UP vector should be applied to the cell corresponding to the input and output relationship. If the input is in the denominator of a model equation, then the input should be given a DOWN (inverse) vector with respect to the dependency. If the input variable is a combined function with some other variable or the user simply does not know which direction the input will influence the output, then the user inserts a VARY vector (up/down) in the appropriate cell of the table.

The user, through some study of the equations that model the I-beam and knowledge of how I-beams are actually designed, can set up the dependency table shown in FIG. 9, such that the table reflects these true relationships between the input and output parameters of the model. The dependency vectors and settings of the table are not always determined by the mathematical model. The selection of the vectors and other attributes in the table may be based on the subjective judgment of the user, or the knowledge gained by the user in evaluating the log history of prior DHS searches to determined which input parameters primarily influence certain output parameters and in which direction.

In addition to specifying the dependency vectors, the user also sets the weight of the goals, conditions, dependencies and parameter to set a preference as to the order of evaluations and changes. The order in which DHS evaluates goals/conditions, dependencies and parameters can influence the quality of the solution. For example, if DHS searches in a hill climbing mode and is susceptible to local optimas, a search can avoid small local optimas by first focusing the search on the most influential goals, dependencies and input parameters, which are likely to jump over solution valleys that are small relative to the search step size, and the setting of the step size will also affect DHS's susceptibility to local optimas. The order of searches and step size tends to be set based on the user's subjective judgment rather than on equations. Equations tend to provide little guidance as to setting search order. However, equations may provide insight as to the dominate input parameters and dependencies, which are of assistance in setting weights for parameters and dependencies.

FIGS. 11A to 11L show a series of flow charts that outline the general flow and organization of the DHS algorithms.

Figure 11A:
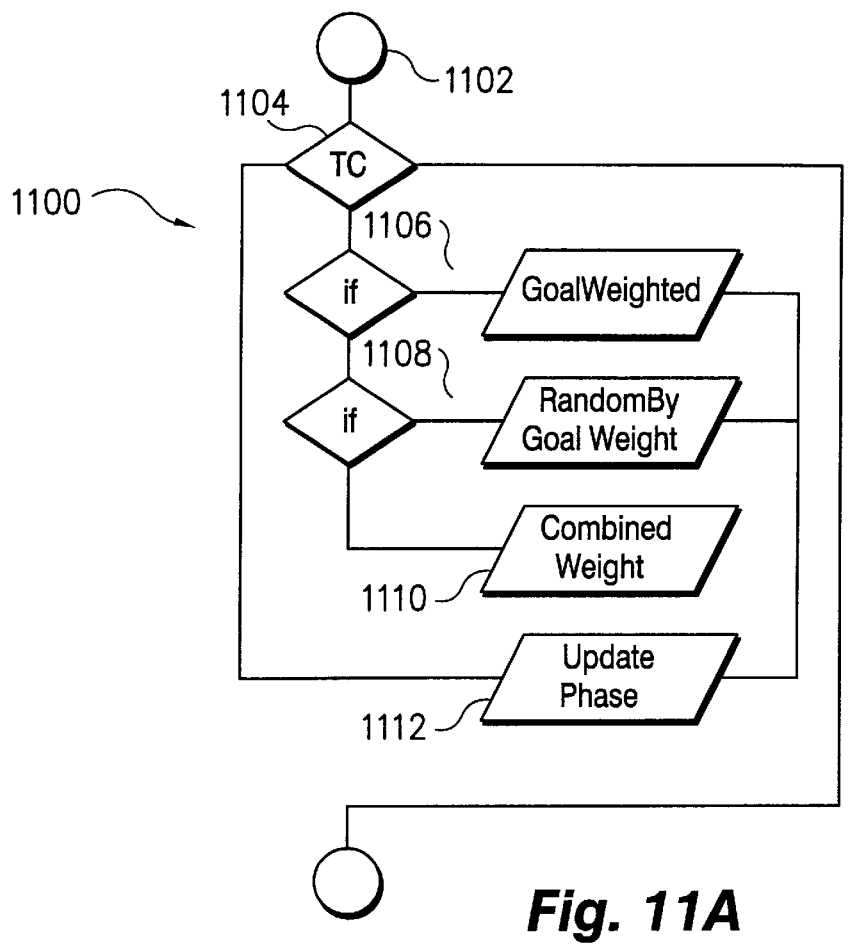
FIGS. 11A to 11L are flow charts showing the DHS process for searching.

FIG. 11A is a flow chart showing the overall process 1100 by which DHS optimizes the solutions to a model or simulation. At the start 1102 of each iteration of the optimization search, DHS conditionally determines whether the optimization has been completed, in step 1004. Until the search is completed, DHS continues its optimization process by determining whether the goals for the model or simulation are to be treated in order of their importance, i.e., goal weight, in step 1106, or some other mode of ordering the search, such as goal weight with random dependencies, step 1108, or by combined weight, step 1110. Once DHS determines how to order its search to evaluate goals, then DHS moves on to order the goals and dependencies in the prescribed manner. At the completion of each of the steps 1106, 1108 and 1110, the DHS process updates, in step 1112, to determine whether DHS is to move from one phase to the next. For example, if all of the hard constraints are satisfied, then in step 1112 DHS moves from phase one to phase two.

Figure 11B:
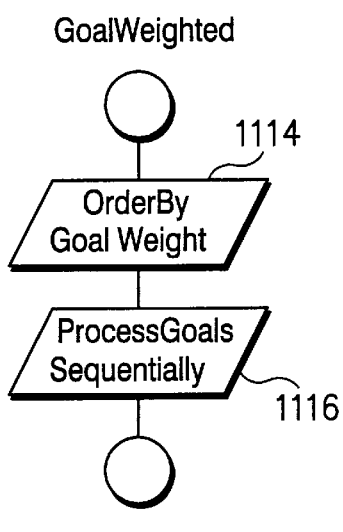
Figure 11C:
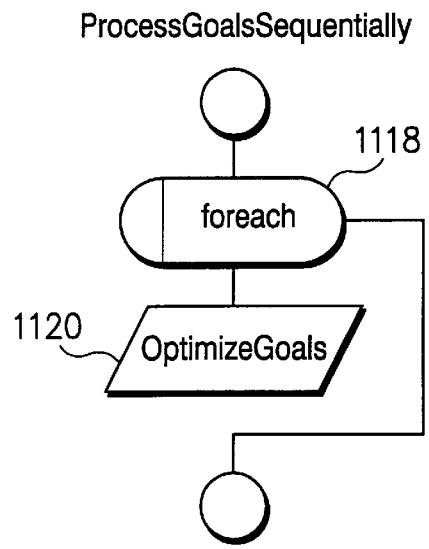

FIG. 11B, shows the process of ordering goals by their weight, step 1114, in which goals are first organized by their respective weights. The search is directed at optimizing each goal sequentially in the order of goal weight, in step 1116. This process of ordering by goal weight is performed also for searches done in the goal weight/random dependency mode. As shown in FIG. 11C, the goals are processed sequentially, 1118, by sequentially optimizing each goal, step 1120, in a loop-wise fashion until all of the goals have been optimized.

Figure 11D:
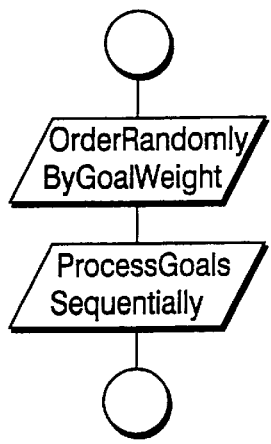
Figure 11E:
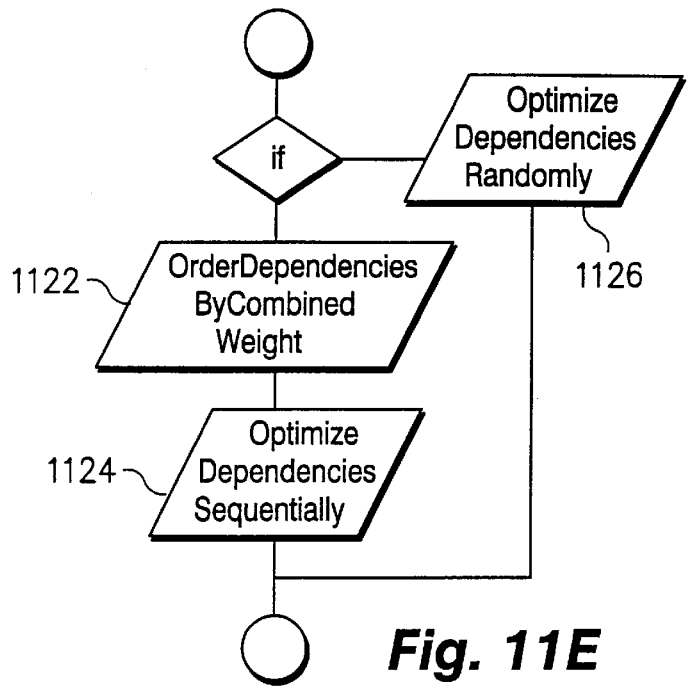

If the goals are to be randomly ordered, the goals are listed randomly, and then optimized sequentially according to the list, as is shown in FIG. 11D. Similarly, if the goals/dependency are to be ordered based on their combined weights, then the product is calculated of the weight of each dependencies with its corresponding goal(s) are organized by that order, step 1122, and each dependency is sequentially optimized in the order of the combined weights, step 1124. Alternatively, the product of the combined weights is used to order the goals, step 1126, and then the dependencies for each goal are optimized in a random order.

Figure 11F:
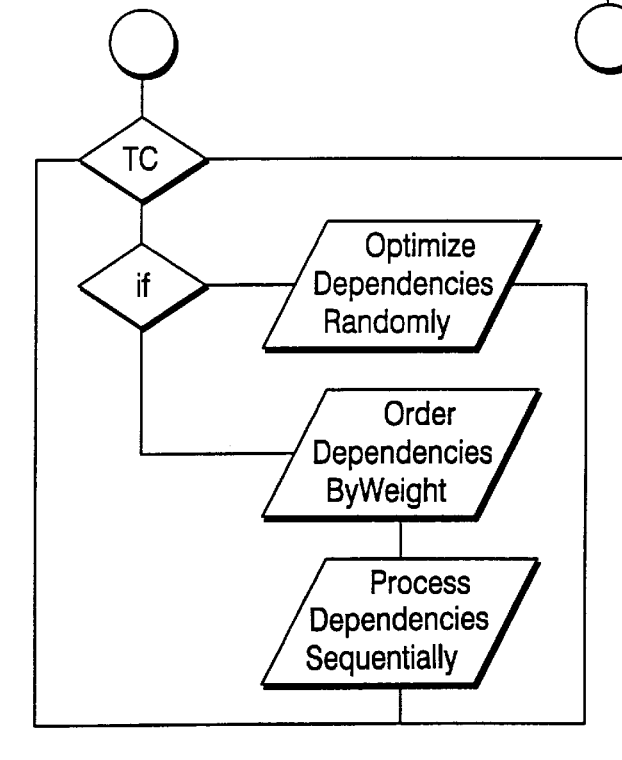
Figure 11F:
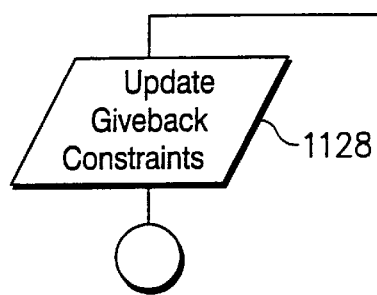
Figure 11G:
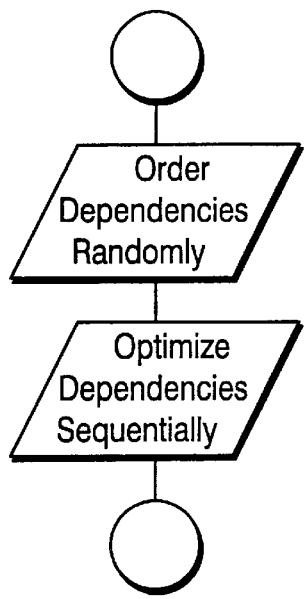
Figure 11H:
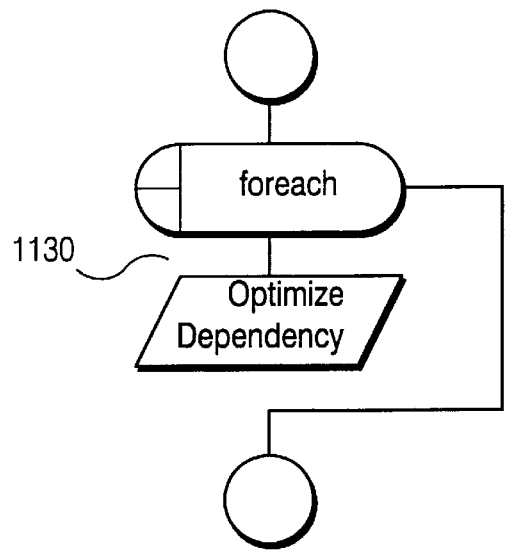

FIG. 11F, shows the process for optimizing each goals that are being sequentially processed by their weight or in a random order. For each goal and where the dependencies are to be sequentially or randomly on processed one-by-one, DHS optimizes the solution by optimizing each dependency that influences that goal. Depending on the user settings, the dependencies for a goal are ordered by the weight of the dependency or randomly (this does not apply to the combined weight mode, simultaneous mode or compete mode). Once the dependencies for a goal have been optimized, the solution values, i.e., constraints and starting parameters are updated and give back values are applied to each output parameter in step 1128. As shown in FIG. 11G, the order in which dependencies are evaluated depends on whether the user has specified that they be evaluated in order of their weights or randomly, or some other criteria. Once the dependencies have been placed in an order, they are evaluated sequentially by optimizing the dependency for each input parameter as is shown in step 1130 of FIG. 11H.

Figure 11I:
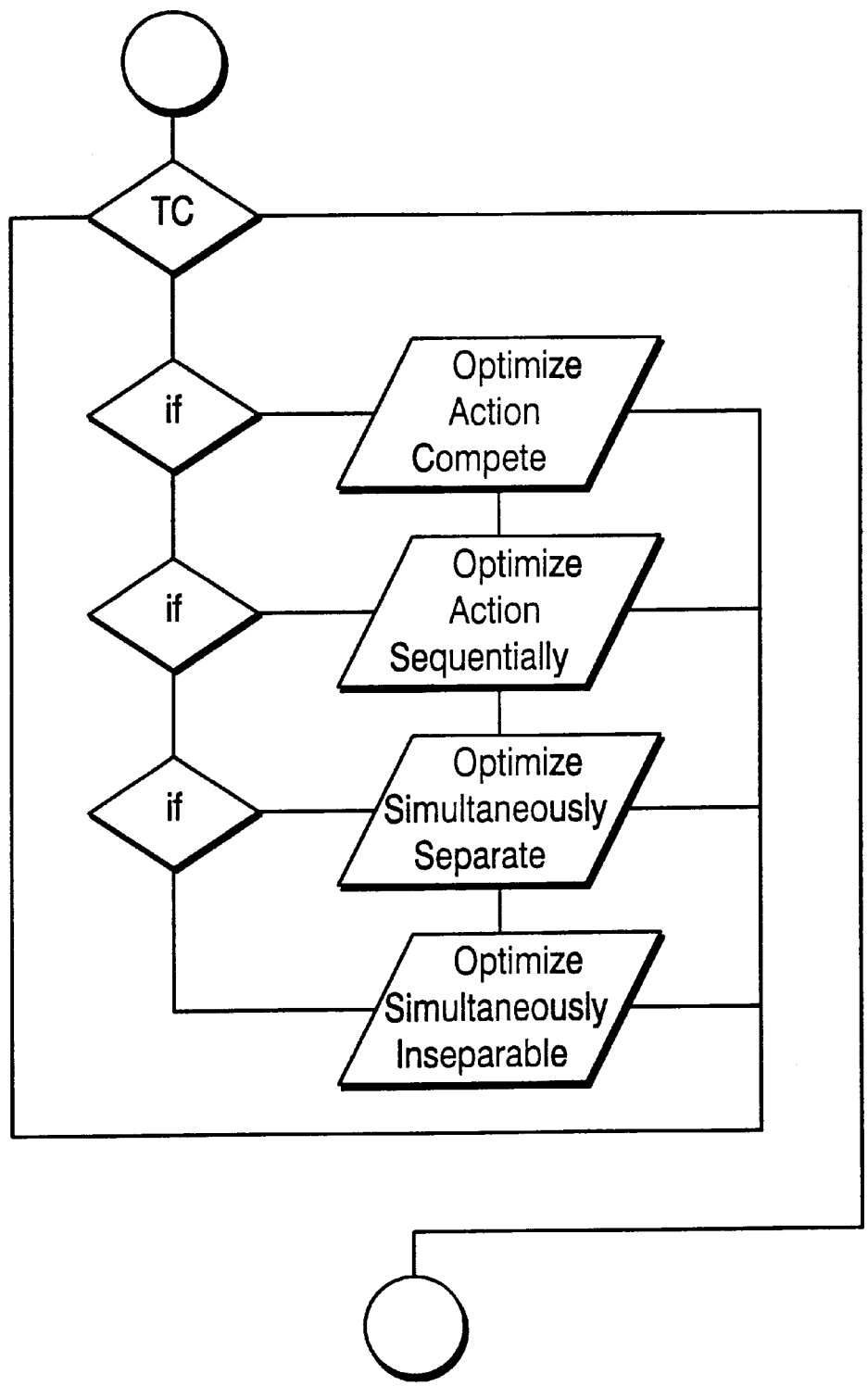
Figure 11J:
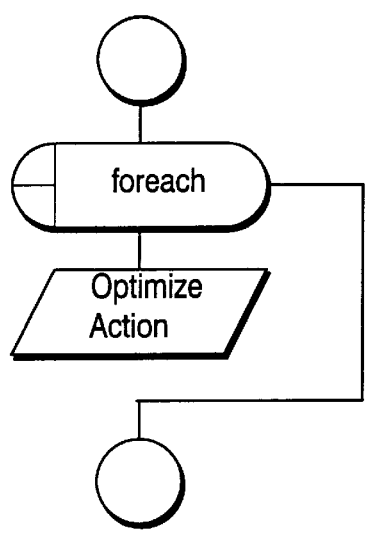
Figure 11L:
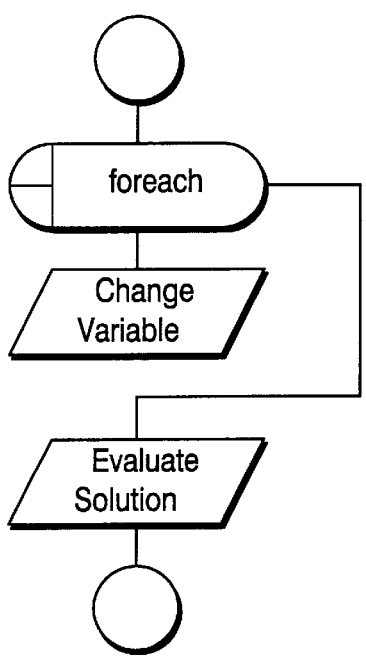
Figure 11K:
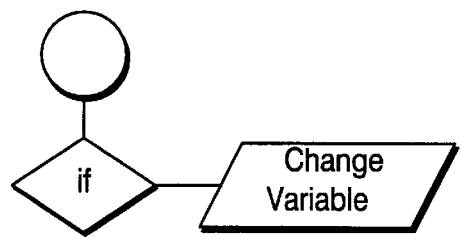

As shown in FIG. 11I, the process by which a dependency is optimized depends on whether the user has set the action for the dependency as compete, sequential, or simultaneous, step 1132. To process dependencies sequentially, the dependency is optimized for each input parameter that influences the dependency as is shown in FIG. 11J. To optimize each of the input parameters for a dependency, the parameter is changed as prescribed by the corresponding dependency action, as is shown in FIG. 11K. The process to simultaneously evaluate a dependency is to change each input parameter and then evaluate the solution as to whether the parameters should be changed again, as is shown in FIG. 11L.

The invention has been described in connection with what is presently considered to be the most practical and preferred embodiment. The invention is not limited to the disclosed embodiment. Rather, the invention covers various modifications and equivalent arrangements included within the spirit and scope of the appended claims.

What is claimed is:

1. A user directed search method for optimizing a model having input and output parameters, where the steps of the method are performed using a computer having a memory device and the computer executes at least one executable program that simulates the model and the input and output parameters are inputs and outputs to the at least one executable program, and the steps comprise the following:

a. Creating a dependency table stored in the memory device, where the dependency table correlates the input parameters to the output parameters of the model and the dependency table indicates how input parameter values should be permutated and the table is at least partially created by a user based on empirical data available to the user and based on user-defined goals;
   b. For a selected output parameter, specifying a group of input parameters, including some but not all of the inputs to the model, that influence the selected output parameter;
   c. Repeating step (b) for a plurality of the output parameters;
   d. For each output parameter of the plurality of output parameters, permutating values for the input parameters in the group of input parameters that influence the selected output parameter;
   e. Solving the model using the permutated values as the input parameters to the model by executing on the computer the at least one executable program using the permutated values as input values to the program;
   f. Optimizing the model by repeating steps (d) and (e) iteratively in accordance with one or more of the goals;
   g. Ending the optimization step (f) after an incremental gain in advancing the solution toward the goal is less than a predetermined minimal gain, and
   h. Outputting an optimized solution to the model after step (g).

2. A user directed search method as set forth in method 1, further comprising the steps of:
   f. Prior to step (d), ranking the output parameters, and performing step (d) with respect to each output parameter in an order dependent on the ranking of output parameters.

3. A user directed search method as set forth in method 1, further comprising the steps of:
   i. Prior to step (d), ranking the input parameter in each of one or more of the groups of input parameters, and performing step (d) with respect to each group of input parameters in an order dependent on the ranking of input parameters.

4. A user directed search method as set forth in method 1, further comprising the steps of:
   i. Prior to step (d), specifying in the dependency table a user selected direction for change of each input parameter in one or more of the groups of input parameters, and in step (d) permutating each input parameter in the direction specified in the dependency table.

5. A user directed search method as set forth in method 4, wherein in step (i) an amount of change to be made to each input parameter is selectable by the user.

6. A user directed search method as set forth in method 5, wherein in step (i) the amount of change to be made to each input parameter is defined as a percentage of a current value of the input parameter.

7. A user directed search method as set forth in method 4, wherein in step (i) the amount of change to be made to each input parameter increases if a current solution to the model is an improvement to the output parameter.

8. A user directed search method for optimizing a model embodied in at least one program executed on a computer having a memory, where the model has user-defined hard constraints on one or more output parameters of the model, user-defined soft constraints on one or more output parameters of the model, and user-defined goals for one or more output parameters of the model, and where a dependency table stored in the memory correlates input parameters to the model to the output parameters, where the input and output parameters and goals are stored in the memory and the steps of the method comprise the following:

a. Solving the model by permutating the input parameters corresponding to the output parameters subject to the hard constraints, until the hard constraints are satisfied;
   b. After step (a), solving the model by permutating the input parameters corresponding to the output parameters subject to the soft constraints, to satisfy the soft constraints without violating any hard constraint;
   c. After step (b), setting values corresponding to the soft constraints as hard constraints;
   d. After step (c), optimizing a solution to the model in accordance with the goals of the model and without violating the constraints, by permutating the input parameters corresponding to the output parameters;
   e. optimizing the solution in step (d) until an incremental gain in advancing the solution to the goal is less than an incremental gain specified for the goal, and
   f. outputting an optimized solution after step (e).

9. A user directed search method as set forth in claim 8 further comprising the following steps:
   g. Assigning a user selected give back value or values to one or more of the goals, and, in step (d), and permitting solutions to vary from goals by an amount equal to the give back value or values.

10. A user directed search method for optimizing a model as in claim 1 wherein the empirical data recited in step (a) includes data learned by the user from observation of a system corresponding to the model.

11. A user directed search method for optimizing a model as in claim 8 further comprising the step of (f) of creating the dependency table by determining relationships between the output parameters and input parameters based on empirical data known to a user.

* * * * *